P. MORDEN.
SPRING MOTOR.
APPLICATION FILED OCT. 23, 1916.
1,249,990.
Patented Dec. 11, 1917.
2 SHEETS—SHEET 1.
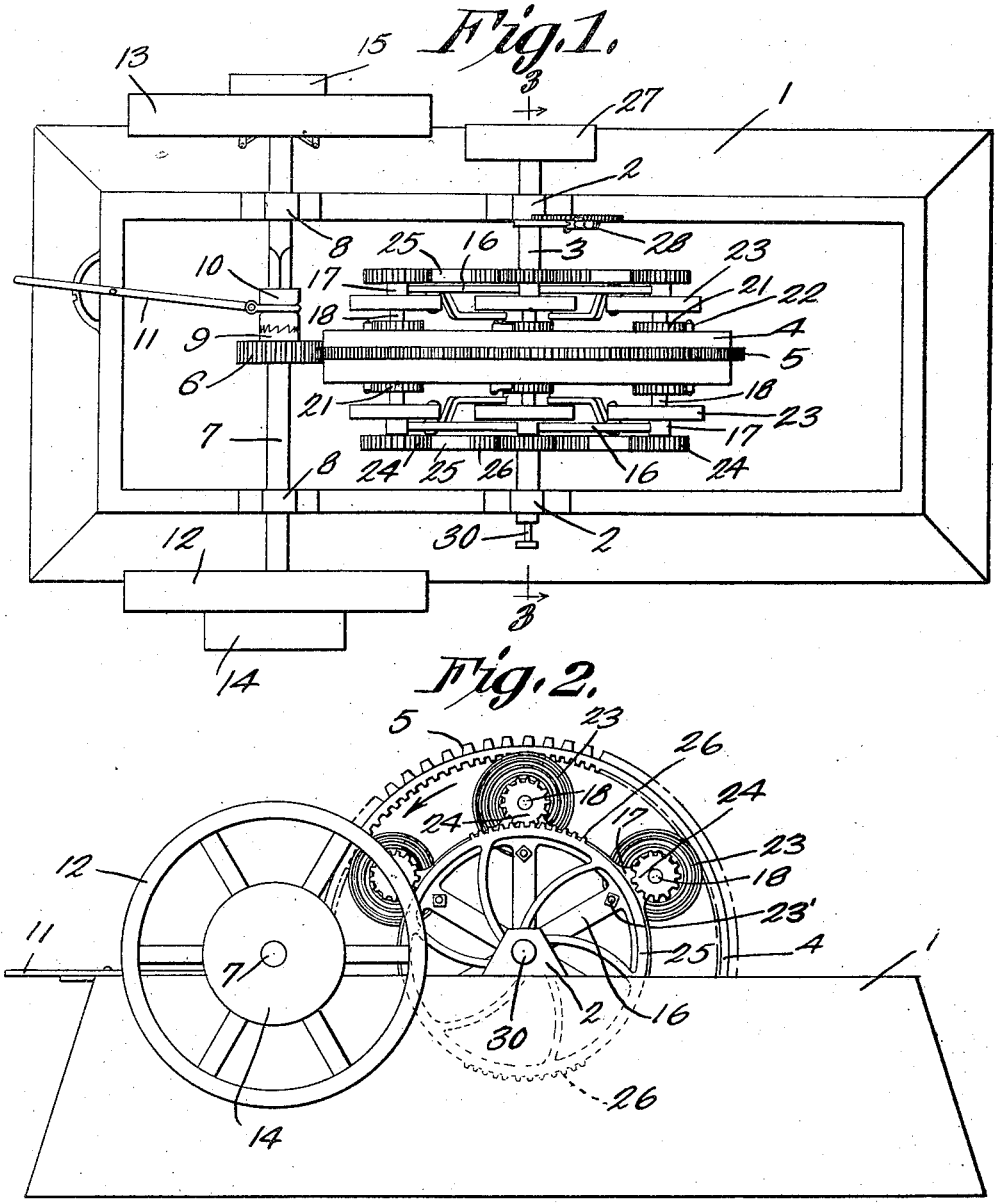

P. MORDEN.
SPRING MOTOR.
APPLICATION FILED OCT. 23, 1916.
1,249,990.
Patented Dec. 11, 1917.
2 SHEETS—SHEET 2.
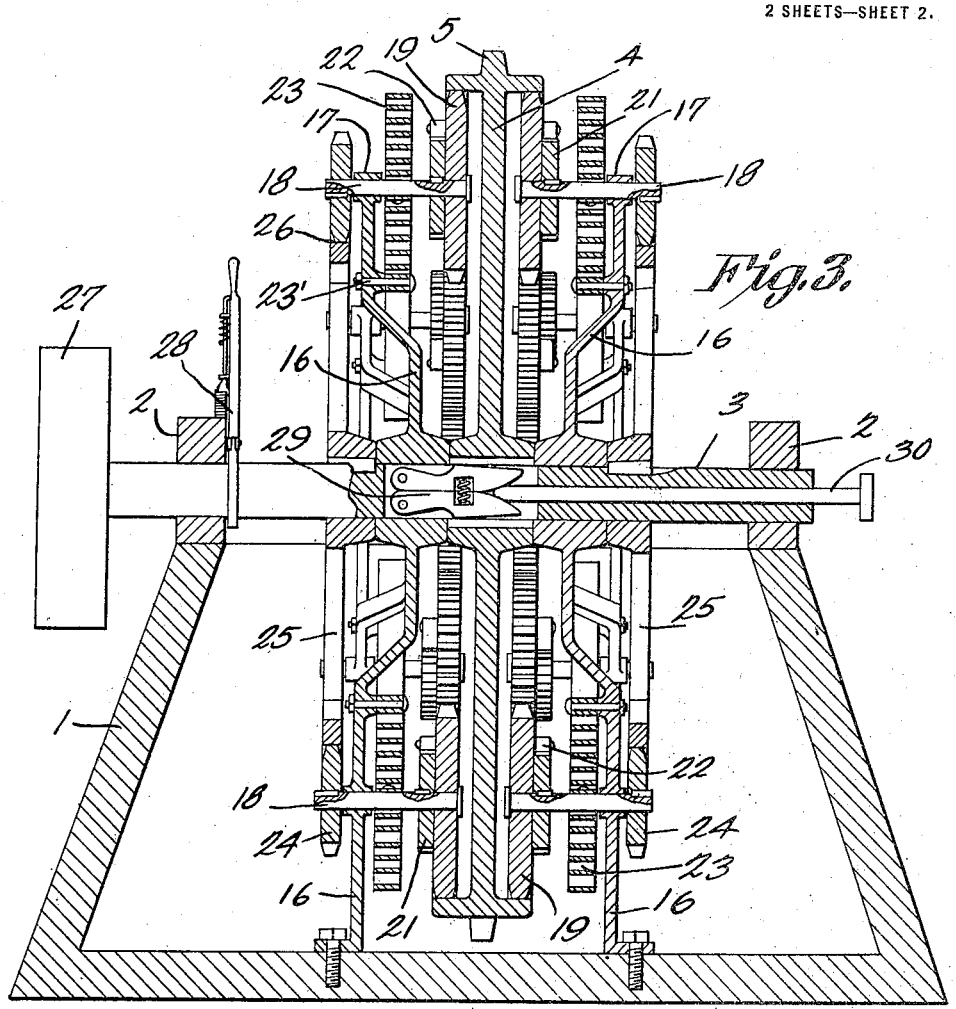
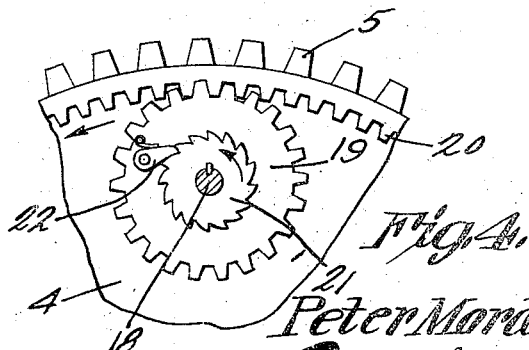
Witnesses
Peter Morden, Inventor
by _____ Attorneys

UNITED STATES PATENT OFFICE.

PETER MORDEN, OF SNOVER, MICHIGAN.

SPRING-MOTOR.

1,249,990.  Specification of Letters Patent.  Patented Dec. 11, 1917.

Application filed October 23, 1916. Serial No. 127,202.

*To all whom it may concern:*

Be it known that I, PETER MORDEN, a citizen of the United States, residing at Snover, in the county of Sanilac and State of Michigan, have invented a new and useful Spring-Motor, of which the following is a specification.

The present invention appertains to prime movers, and aims to provide a power machine deriving its power from springs in a novel manner.

It is the object of the invention to provide a spring motor of novel and improved construction for operating an electric generator, churn, washing machine, or other appliance.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the spring motor.

Fig. 2 is a side elevation thereof.

Fig. 3 is an enlarged cross section taken on the line 3—3 of Fig. 1.

Fig. 4 is an enlarged fragmental detail illustrating one of the spur gears and its ratchet wheel.

The mechanism is carried by a suitable base 1 having the bearings 2 through which a transverse shaft 3 is journaled for rotation, and a driving wheel 4 is mounted for rotation upon the shaft 3 and has external gear teeth 5 meshing with a pinion 6 rotatable upon transverse shaft 7 journaled in bearings 8 carried by the base. The pinion 6 has a clutch hub 9 with which a clutch member 10 slidable upon the shaft 7 is engageable, the clutch member 10 being operated by a hand lever 11 of any suitable sort. When the clutch member 10 is removed from the clutch hub 9, the pinion 6 rotates loosely upon the shaft 7 without turning it, but when the clutch member is moved into engagement with the clutch hub 9, the shaft 7 will be rotated with the pinion 6. Fly wheels 12 and 13 are mounted upon the shaft 7 at its opposite ends, and a pulley wheel 14 for the engagement of a belt is carried by the shaft 7 adjacent to the fly wheel 12, whereby the power can be transmitted to the machine to be operated. A suitable governor 15 can be assembled with the fly wheel 13 for controlling the speed of the shaft 7 in any well known manner.

The devices for actuating the wheel 4 embody opposite frames 16 mounted upon the base at opposite sides of the wheel 4 and having annular series of bearings 17 through which short shafts 18 are journaled for rotation and spur gears 19 are mounted loosely upon the shafts 18 adjacent to the wheel 4 and mesh with internal gear teeth 20 with which the rim of said wheel 4 is provided at opposite sides. Ratchet wheels 21 are keyed or secured upon the shafts 18 next outside the spur gears 19, and said spur gears carry spring pressed pawls 22 engageable with the teeth of the ratchet wheels, whereby when the ratchet wheels are rotated with the shafts 18 under spring tension, the gears 19 will be rotated with the ratchet wheels for rotating the driving wheel 4. The shafts 18, of which there may be any number, are rotated by spiral springs 23 having their inner ends secured to the shafts and having their outer ends secured, as at 23', to the frames 16. When the springs are wound up, they tend to rotate the ratchet wheels 21 in the direction of the arrow in Fig. 4, thereby rotating the spur gears 19 to actuate the wheel 4.

In order to wind up the springs, pinions or spur gears 24 of smaller diameter than the spur gears 19 are keyed or secured upon the outer protruding ends of the shafts 18 and are coöperable with mutilated gear wheels 25 keyed upon the shaft 3 and having series of teeth 26 at spaced points and of limited length, the remainder of the peripheries of the wheels 25 being blank. A pulley wheel 27 or other suitable means is attached to one end of the shaft 3 for rotating it to start the machine, and any suitable brake 28 is employed for retarding the rotation of the shaft 3 when this is desired.

A suitable clutch 29 is carried by the shaft 3 for engaging the hub of the wheel 4 whereby to rotate the shaft 3 and wheel 4 together when this is desired, the clutch 29 being actuated by a stem 30 slidable in and projecting from the shaft 3.

To start the machine, the clutch 29 is released, and the shaft 3 is rotated thereby to rotate the mutilated gear wheels 25, and as the teeth 26 thereof engage the pinions 24, said pinions will be rotated in the proper direction to wind up the springs 23. When the shafts 18 are rotated by the engagement of the pinions 24 with the teeth 26, the ratchet wheels 21 rotate clockwise as seen in Fig. 4, and the spur gears 19 can rotate in the opposite direction without interference due to the motion of the wheel 4. Those pinions 24 which are not engaged by the teeth 26, as when the teeth 26 move away from said pinions, are free to rotate in the opposite direction due to the unwinding of the springs 23, whereby the gears 19 will be rotated by the shafts 18, to actuate the wheel 4. Thus, the springs 23 of the two sets are wound up intermittently during the rotation of the gear wheels 25, some of the springs being wound up while the others are unwinding to actuate the wheel 4. After the springs have been wound up sufficiently, the wheel 4 rotating in the same direction as the shaft 3, the clutch 29 can be thrown in, so that the shaft 3 will be rotated with the wheel 4, thus rotating the gear wheels 25 with the wheel 4 to continue the winding up of the springs as the wheel 4 rotates, and thus prolonging the operation of the machine.

Having thus described the invention, what is claimed as new is:—

1. A spring motor embodying a rotatable wheel having gear teeth, a rotatable mutilated gear, a frame, shafts carried by the frame, gears rotatable upon the shafts and meshing with said teeth, springs for rotating said shafts, means for rotating the gears with the shafts when they are spring actuated, pinions carried by said shafts to be engaged by the mutilated gear for winding up the springs, and means for connecting and disconnecting the first mentioned gear and wheel.

2. A spring motor embodying a frame, a shaft extending through said frame, a wheel rotatable upon said shaft, a gear secured and rotatable with said shaft, means for connecting said wheel with the shaft to rotate therewith, a plurality of shafts carried by the frame, gears carried by the last mentioned shafts and meshing with said wheel, springs between the last mentioned shafts and frame for rotating said shafts, means for rotating the last mentioned gears with the last mentioned shafts when they are spring actuated, pinions carried by the last mentioned shafts, the first mentioned gear having mutilated teeth to mesh with said pinions for winding up the springs.

In testimony that I claim the foregoing as my own, I have hereto affixed my signature in the presence of two witnesses.

PETER MORDEN.

Witnesses:
   CHAS. L. BELL,
   A. E. WILLIAMS.